(12) United States Patent
Zhang et al.

(10) Patent No.: US 11,996,508 B2
(45) Date of Patent: May 28, 2024

(54) WINDING SHAFT STRUCTURE AND WINDING APPARATUS

(71) Applicant: CONTEMPORARY AMPEREX TECHNOLOGY CO., LIMITED, Ningde (CN)

(72) Inventors: Xiaowei Zhang, Ningde (CN); Jun Ni, Ningde (CN); Zhiwen Wang, Ningde (CN); Yuqian Wen, Ningde (CN); Minghao Tang, Ningde (CN); Chao Xie, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/326,322

(22) Filed: May 31, 2023

(65) Prior Publication Data

US 2023/0318011 A1 Oct. 5, 2023

Related U.S. Application Data

(63) Continuation of application No. PCT/CN2022/100850, filed on Jun. 23, 2022.

(30) Foreign Application Priority Data

Sep. 17, 2021 (CN) .......................... 202111095068.9

(51) Int. Cl.
*H01M 10/04* (2006.01)
(52) U.S. Cl.
CPC .............................. *H01M 10/0409* (2013.01)

(58) Field of Classification Search
CPC ................................................. H01M 10/0409
See application file for complete search history.

(56) References Cited

FOREIGN PATENT DOCUMENTS

| CN | 202871915 U | * | 4/2013 | |
|---|---|---|---|---|
| CN | 202871915 U | | 4/2013 | |
| CN | 106025326 A | * | 10/2016 | ........ H01M 10/0409 |

(Continued)

OTHER PUBLICATIONS

JP-2017191645-A translation (Year: 2017).*

(Continued)

*Primary Examiner* — Pamela H Weiss
*Assistant Examiner* — Amanda Rosenbaum
(74) *Attorney, Agent, or Firm* — ANOVA LAW GROUP, PLLC

(57) ABSTRACT

A winding shaft structure includes a winding shaft holder rotatable around an axial direction of the winding shaft structure, a first shaft group connected to one side of the winding shaft holder in the axial direction and configured to rotate together with the winding shaft holder, a second shaft group disposed on a side of the first shaft group in a radial direction of the winding shaft structure, a connecting member connected between the first shaft group and the second shaft group such that the second shaft group is movable with respect to the first shaft group in the radial direction via the connecting member, and a piezoelectric adjustment member disposed between the first shaft group and the second shaft group and deformable in the radial direction to adjust a distance between the first shaft group and the second shaft group.

11 Claims, 7 Drawing Sheets

(56) References Cited

FOREIGN PATENT DOCUMENTS

| | | | | | |
|---|---|---|---|---|---|
| CN | 107293807 | A | | 10/2017 | |
| CN | 108400370 | A | | 8/2018 | |
| CN | 210489755 | U | | 5/2020 | |
| CN | 111653801 | A | * | 9/2020 | ........ H01M 10/0409 |
| CN | 212366001 | U | | 1/2021 | |
| CN | 112736296 | A | | 4/2021 | |
| CN | 213459849 | U | | 6/2021 | |
| CN | 113270630 | A | | 8/2021 | |
| JP | 2014133652 | A | * | 7/2014 | |
| JP | 2017191645 | A | * | 10/2017 | ............. B65H 18/08 |
| KR | 20160090011 | A | * | 7/2016 | |

OTHER PUBLICATIONS

CN-202871915-U translation (Year: 2013).*
CN 111653801 A translation (Year: 2020).*
KR20160090011A translation (Year: 2016).*
CN 106025326 A translation (Year: 2016).*
JP 2014133652 A (Year: 2014).*
The World Intellectual Property Organization (WIPO) International Search Report for PCT/CN2022/100850 Sep. 28, 2022 4 pages (including English translation).

* cited by examiner

WINDING SHAFT STRUCTURE AND WINDING APPARATUS

CROSS-REFERENCE TO RELATED APPLICATIONS

This application is a continuation of International Application No. PCT/CN2022/100850, filed on Jun. 23, 2022, which claims priority to Chinese patent application No. 202111095068.9 filed on Sep. 17, 2021 and entitled "WINDING SHAFT STRUCTURE AND WINDING APPARATUS", which are incorporated herein by reference in their entirety.

TECHNICAL FIELD

This application relates to the battery field, and specifically, to a winding shaft structure and a winding apparatus.

BACKGROUND

Energy conservation and emission reduction are crucial to the sustainable development of the automotive industry. Electric vehicles, with their advantages in energy conservation and emission reduction, have become an important part of the sustainable development of the automobile industry. For electric vehicles, battery technologies are an important factor that is vital to their development.

In the process of battery production, wound cells are formed by winding separators and electrode plates with a winding shaft structure of a winding apparatus. The radial length of the winding shaft in the winding shaft structure is related to the alignment degree between electrode plates and tabs and the size of cells. Therefore, the radial length of the winding shaft in the winding shaft structure directly influences the quality of cells. However, it is hard to adjust the radial length of the winding shafts in existing winding shaft structures.

SUMMARY

Given the foregoing problem, this application provides a winding shaft structure and a winding apparatus, to alleviate the hardship in adjusting the radial length of a winding shaft in a winding shaft structure.

According to a first aspect, this application provides a winding shaft structure, including a winding shaft holder, rotatable around an axial direction of the winding shaft structure; a first shaft group, connected to one side of the winding shaft holder in the axial direction and able to rotate as the winding shaft holder rotates; a second shaft group, disposed on a side of the first shaft group in a radial direction of the winding shaft structure; a connecting member, connected between the first shaft group and the second shaft group, where the second shaft group is movable with respect to the first shaft group in the radial direction via the connecting member; a piezoelectric adjustment member, disposed between the first shaft group and the second shaft group, where the piezoelectric adjustment member is deformable in the radial direction, so as to adjust distance between the first shaft group and the second shaft group by deformation of the piezoelectric adjustment member.

In the technical solution of embodiments of this application, the winding shaft structure includes the winding shaft holder, the first shaft group, the second shaft group, the connecting member, and the piezoelectric adjustment member. The winding shaft holder is rotatable so that the winding shaft holder could drive the first shaft group and the second shaft group to rotate, thereby winding electrode plates wound around the second shaft group to form cells. The first shaft group and the second shaft group are connected via the connecting member, and the second shaft group is movable with respect to the first shaft group via the connecting member in the radial direction. Therefore, the radial length of an outer contour of the second shaft group can be changed so as to change positions of electrode plates wound around the second shaft group. The piezoelectric adjustment member is configured to adjust distance between the first shaft group and the second shaft group by deformation. For one, the adjustment by the deformation of the piezoelectric adjustment member facilitates a simple structure and ease of use; for another, such adjustment can reduce friction between the first shaft group and the piezoelectric adjustment member and between the second shaft group and the piezoelectric adjustment member, thereby reducing metal fragments produced by the friction which fall to the electrode plates to affect the performance of cells. Therefore, the winding shaft structure provided in embodiments of this application is not only able to adjust its radial length but also simple in structure, easy to use, and not prone to produce metal fragments.

In some embodiments, the first shaft group includes at least two inner shafts, where the at least two inner shafts are distributed around an axis extending in the axial direction and the winding shaft holder is rotatable around the axis; and the second shaft group includes at least two outer shafts, where the outer shafts each are disposed on a side of the respective inner shaft away from the axis, each of the outer shafts is connected to the respective inner shaft via the respective connecting member, and the piezoelectric adjustment member is disposed between each of the outer shafts and the respective inner shaft. Providing the plurality of inner shafts and the outer shafts corresponding to the inner shafts respectively allows increasing the size of radial adjustment, adjusting radial lengths of the winding shaft structure at different locations, and adjusting the shape of the winding shaft structure.

In some embodiments, the first shaft group has a first surface on a side facing towards the second shaft group; the second shaft group has a second surface on a side facing towards the first shaft group; and at least one of the first surface or the second surface recesses to form an accommodating chamber, and at least some of the piezoelectric adjustment members are disposed in the accommodating chamber. The provision of the accommodating chamber limits the position of the piezoelectric adjustment member, reducing sway of the piezoelectric adjustment member between the first shaft group and the second shaft group, thus reducing friction between the first shaft group and the piezoelectric adjustment member and between the second shaft group and the piezoelectric adjustment member, making it less prone to produce metal fragments.

In some embodiments, the second surface recesses to form the accommodating chamber; and the first shaft group includes a mounting hole running through in the radial direction and a mounting boss disposed in the mounting hole, where the mounting hole communicates with the accommodating chamber, the mounting boss is formed by the first shaft group protruding towards an inner surface of the mounting hole, and the piezoelectric adjustment member is disposed on the mounting boss. Provided on the first shaft group, the mounting boss can be used to make the first shaft group and the piezoelectric adjustment member press against each other, reducing a fit area between the first shaft group and the piezoelectric adjustment member. For one, this can make preparation of the first shaft group and the piezoelectric adjustment member less difficult; for another, it can further reduce friction between the first shaft group and the piezoelectric adjustment member, making it less prone to produce metal fragments.

In some embodiments, the second shaft group has a locking hole in communication with the accommodating chamber and the piezoelectric adjustment member is connected to the second shaft group via the locking hole. The second shaft group and the piezoelectric adjustment member can be mutually locked via the locking hole, which enhances the relative position stability of the second shaft group and the piezoelectric adjustment member, reducing relative sway of the second shaft group and the piezoelectric adjustment member, thus reducing friction between the second shaft group and the piezoelectric adjustment member, making it less prone to produce metal fragments.

In some embodiments, the first surface recesses to form a first connecting hole; the second shaft group has a second connecting hole running through in the radial direction and communicating with the first connecting hole; and the connecting member is disposed in the first connecting hole and the second connecting hole to connect the first shaft group to the second shaft group. The connecting member disposed in the first connecting hole and the second connecting hole not only connects the first shaft group to the second shaft group but also clamps the piezoelectric adjustment member between the first shaft group and the second shaft group.

In some embodiments, the connecting member includes: a connecting rod, configured to run through the first connecting hole and the second connecting hole; a stopping part, disposed on a side of the connecting rod away from the first shaft group; and a resetting member, where the first connecting hole is a step-like hole and includes a recess, the recess is on a side of the stopping part facing towards the first surface, the resetting member is stopped between the stopping part and the recess, and the resetting member provides a reset force in the radial direction. Via the reset force, the first shaft group and the second shaft group are provided with a reset force. Therefore, both the relative position stability of the first shaft group and the second shaft group can be ensured both before and after the second shaft group moves in the radial direction with respect to the first shaft group via the piezoelectric adjustment member, thus reducing friction between the first shaft group and the piezoelectric adjustment member and between the second shaft group and the piezoelectric adjustment member, making it less prone to produce metal fragments.

In some embodiments, the winding shaft structure further includes a spacer disposed between the piezoelectric adjustment member and the second shaft group, where the piezoelectric adjustment member drives, via the spacer, the second shaft group to move in the radial direction. A contact area between the spacer and the piezoelectric adjustment member and a contact area between the spacer and the second shaft group are both smaller than a contact area between the second shaft group and the piezoelectric adjustment member, which not only makes preparation of the second shaft group and the outer surface of the piezoelectric adjustment member less difficult but also reduces the friction between the second shaft group and the piezoelectric adjustment member, making it less prone to produce metal fragments.

In some embodiments, the winding shaft structure further includes a distance sensor configured to obtain distance between the first shaft group and the second shaft group in the radial direction. The distance between the first shaft group and the second shaft group can be obtained via the distance sensor, making it possible to determine the size of the outer contour of the second shaft group and the winding size of the electrode plates wound around the second shaft group.

In some embodiments, the distance sensor includes a sensing piece and a receiver, and of the sensing piece and the receiver, one is disposed in the second shaft group and the other one is disposed in the winding shaft holder. The receiver receives information from the sensing piece, which facilitates determination of sizes of the first shaft group and the second shaft group in the radial direction.

In some embodiments, the winding shaft structure further includes: a first connecting lead, connected to the piezoelectric adjustment member; a second connecting lead, configured to connect an external electric device; and an electric slip ring structure, connecting the first connecting lead and the second connecting lead so that the first connecting lead is rotatable around the axis with respect to the second connecting lead via the slip ring structure. The winding shaft holder rotates when winding the electrode plates, and the first shaft group and the second shaft group disposed in the winding shaft holder as well as the piezoelectric adjustment member between the first shaft group and the second shaft group will also rotate, resulting in rotation of the first connecting lead. Providing the electric slip ring makes the first connecting lead rotatable with respect to the second connecting lead, thus alleviating the inconvenience of use caused by twisting of the second connecting lead and prolonging the service life of the first connecting lead and the second connecting lead.

According to a second aspect, this application provides a winding apparatus configured to wind electrode plates and separators to form cells, where the winding apparatus includes: a detection component, configured to detect misalignment information of the electrode plates; the winding shaft structure according to the foregoing embodiments; a processing component, communicatively connected to the detection component and the piezoelectric adjustment member and configured to control deformation of the piezoelectric adjustment member based on the misalignment information.

In some embodiments, the detection component includes: a first detection part, configured to detect misalignment information of the electrode plates; and/or a second detection part, configured to detect thickness information of the electrode plates and/or the separators and verify the misalignment information based on the thickness information.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

Persons of ordinary skill in the art can clearly understand various other advantages and benefits by reading the detailed description of some embodiments below. The accompanying drawings are intended to illustrate some embodiments only rather than to limit this application. In addition, in all the accompanying drawings, same parts are indicated by same accompanying signs. In the accompanying drawings.

Figure 1:
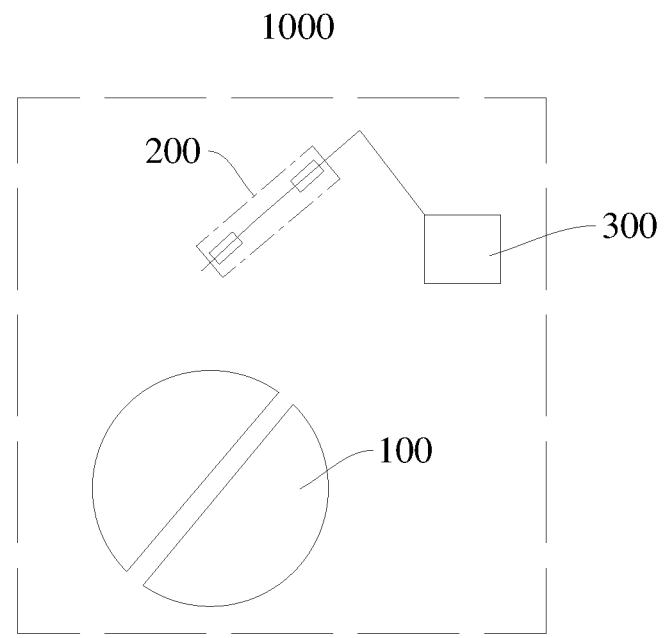
FIG. 1 is a schematic structural diagram of a winding apparatus according to some embodiments of this application.

Reference signs in specific embodiments are as follows:
winding apparatus 1000; winding shaft structure 100; detection component 200; first detection part 210; second detection part 220; processing component 300; first dancer roll 410; second dancer roll 420; third dancer roll 430; fourth dancer roll 440; winding shaft holder 110; first shaft group 120; inner shaft 120a; first surface 121; mounting hole 122; mounting boss 123; first connecting hole 124; inner surface 125; second shaft group 130; outer shaft 130a; second surface 131; locking hole 132; screw 133; second connecting hole 134; alcove 134a; inner side 135; connecting member 140; connecting rod 141; stopping part 142; resetting member 143; piezoelectric adjustment member 150; piezoelectric crystal 151; mechanical amplifying structure 152; accommodating chamber 160; spacer 170; distance sensor 180; sensing piece 181; receiver 182; first connecting lead 191; second connecting lead 192; electric slip ring 193; first electrode plate 11; second electrode plate 12; first separator 21; and second separator 22.

DESCRIPTION OF EMBODIMENTS

The following describes in detail embodiments of technical solutions of this application with reference to the accompanying drawings. The following embodiments are intended for a clearer description of the technical solutions of this application, and therefore they are used as examples only and do not constitute any limitation on the protection scope of this application.

Unless otherwise defined, all technical and scientific terms used herein shall have the same meanings as commonly understood by those skilled in the art to which this application belongs. The terms used herein are intended to describe the specific embodiments only rather than to constitute any limitation on this application. The terms "include", "comprise", and "have" and any other variations thereof in the specification, the claims and the foregoing brief description of drawings of this application are intended to cover a non-exclusive inclusion.

In descriptions of embodiments of this application, the terms "first", "second" and the like are merely intended to distinguish between different objects, and shall not be understood as any indication or implication of relative importance or any implicit indication of the number, specific sequence or primary-secondary relationship of the technical features indicated. In the descriptions of this application, "a plurality of" means at least two unless otherwise specifically stated.

In this specification, reference to "embodiment" means that specific features, structures or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. Persons skilled in the art explicitly and implicitly understand that the embodiments described herein may combine with other embodiments.

In the descriptions of embodiments of this application, the term "and/or" in this application describes only an association relationship for describing associated objects and represents that three relationships may be present. For example, A and/or B may represent the presence of the following three cases: A alone, both A and B, and B alone. In addition, the character "I" in this specification generally indicates an "or" relationship between contextually associated objects.

In the description of the embodiments of this application, the term "a plurality of" means more than two (inclusive). Similarly, "a plurality of groups" means more than two (inclusive) groups, and "a plurality of pieces" means more than two (inclusive) pieces.

In the description of the embodiments of this application, the orientations or positional relationships indicated by the technical terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of description of the embodiments of this application rather than indicating or implying that the apparatuses or components mentioned must have specific orientations or must be constructed or manipulated according to specific orientations, and therefore shall not be construed as any limitations on embodiments of this application.

In the description of the embodiments of this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, any may refer to a direct connection, an indirect connection via an intermediate medium, or an interaction between two elements. Persons of ordinary skill in the art can understand specific meanings of these terms in this application as appropriate to specific situations.

Currently, from the perspective of market development, application of electric vehicle batteries is becoming more and more extensive. Traction batteries have been widely used in energy storage power supply systems such as hydroelectric power plants, thermal power plants, wind power plants, and solar power plants, and many other fields including electric transportation tools such as electric bicycles, electric motorcycles, and electric vehicles, military equipment, and aerospace. With the continuous expansion of application fields of traction batteries, market demands for traction batteries are also expanding.

In the process of battery production, wound cells are formed by winding separators and electrode plates with winding shafts in a winding shaft structure of a winding apparatus. The radial length of the winding shafts is related to the alignment degree between electrode plates and tabs and the size of cells. Therefore, the radial length of the winding shafts directly affects the quality of cells.

However, the inventors have found that it is hard to adjust the radial length of the winding shafts in existing winding shaft structures. In some related technologies, even though the radial length of some winding shafts is adjustable, technical problems still exit. For example, the mechanism to adjust the radial length of winding shafts in a winding shaft structure in related technologies is usually a simple adjustment based on motion under mechanical contact. The precision of mechanical movement is often as low as ±0.01 mm, and to achieve such a precision, it is often necessary to finish cut the parts and components of the winding shaft structure, which greatly increases the production cost of winding shaft structures. However, the production of cells for some batteries demands that the adjustment precision of the radial length of winding shafts is at least 0.08 mm. For thick cells, for example, cells formed by winding 42 layers of electrode plates, the overall adjustment precision is possibly up to 0.08 mm×42=3.36 mm. In that case, the adjustment precision for the radial length of winding shafts in the related technologies could hardly satisfy the need.

In addition, the inventors have also found that, since the radial length of winding shafts in the winding shaft structure is adjusted by motion under mechanical contact as in the related technologies, mechanical friction is present as the radial length of winding shafts changes. Therefore, in the changing of the radial length of winding shafts, metal fragments are inevitably produced. And the metal fragments so produced at the winding shafts are very likely to fall into cells to pierce the separators, resulting in the risk of short circuit, which will affect the safety of the cells.

To solve the technical problem mentioned above, the applicant has found through research that distance between an inner shaft and an outer shaft in a winding shaft structure can be adjusted via deformation of a piezoelectric component, the deformation of the piezoelectric component can reduce friction between the inner shaft and the outer shaft, and the adjustment amount of the radial length of winding shafts can be increased by properly setting the deformation amount of the piezoelectric component.

Based on such consideration, to alleviate the hardship in adjusting the radial length of winding shafts, the inventors have designed a winding shaft structure through in-depth research. A piezoelectric adjustment member is provided between a first shaft group (inner shafts) and a second shaft group (outer shafts). Distance between the first shaft group and the second shaft group is adjusted via deformation of the piezoelectric adjustment member, thereby adjusting the radial length of the winding shafts. The piezoelectric adjustment member may include, for example, a piezoelectric crystal. Distance between the first shaft group and the second shaft group in a radial direction can be directly adjusted via deformation of the piezoelectric crystal.

The piezoelectric crystal deformation adjustment member is controlled specifically by electric field intensity. Therefore, the electric field intensity can be used to control the deformation amount of the piezoelectric crystal, thereby controlling the distance between the first shaft group and the second shaft group.

In this application, the distance between the first shaft group and the second shaft group is adjusted via the deformation of a piezoelectric adjustment member, instead of such ways as sliding under mechanical contact. This can, for one, reduce metal fragments produced by friction, and, for another, allow adjusting the adjustment amount of the radial length of winding shafts by properly adjusting the deformation amount of the piezoelectric adjustment member.

The winding shaft structure disclosed in embodiments of this application can be used to make not only battery cells but also any other parts that are formed by winding.

A winding apparatus is provided in embodiments of this application, where the winding apparatus can be used to prepare cells of battery packs and produce and prepare other parts by winding.

For ease of illustration, in the following embodiments, a winding shaft structure and winding apparatus for preparing cells of battery packs according to embodiments of this application are used as examples.

Refer to FIG. 1. FIG. 1 is a schematic structural diagram of a winding apparatus 1000 provided in some embodiments of this application.

As shown in FIG. 1, the winding apparatus 1000 includes: a detection component 200, configured to detect misalignment information of electrode plates; a winding shaft structure 100, configured to wind the electrode plates; and a processing component 300, communicatively connected to the detection component 200 and the winding shaft structure 100 and configured to control radial length of the winding shaft structure 100 based on the misalignment information.

Figure 2:
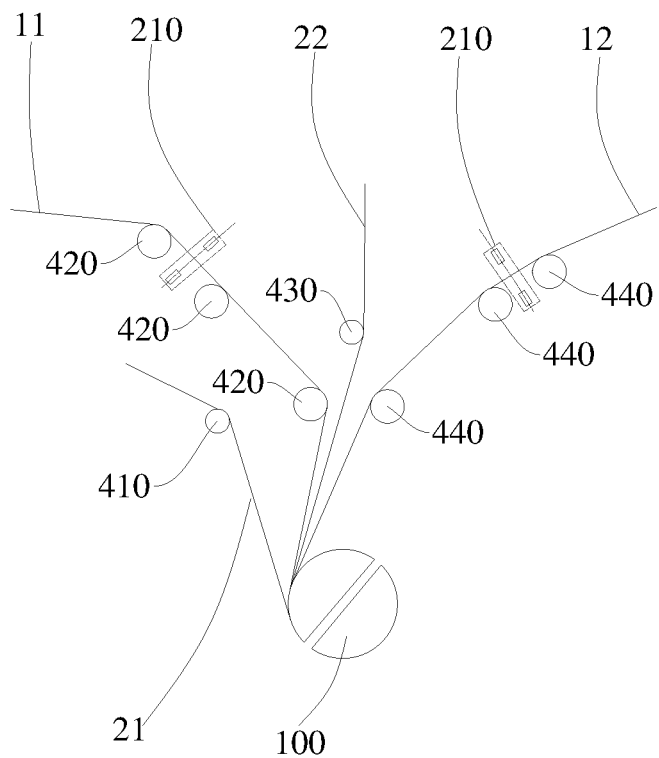
FIG. 2 is a schematic structural diagram of a winding apparatus according to some other embodiments of this application.
Figure 3:
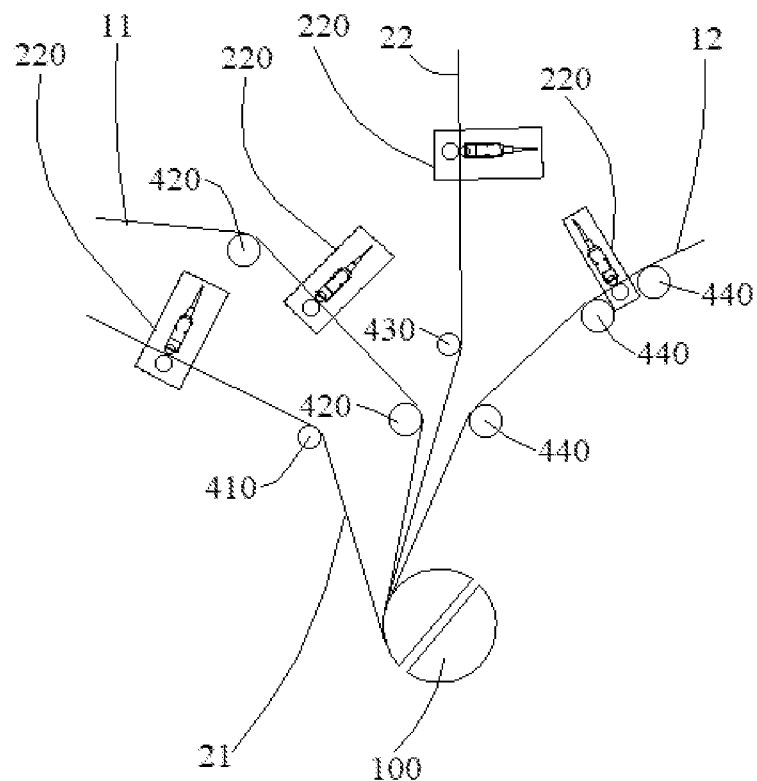
FIG. 3 is a schematic structural diagram of a winding apparatus according to still some other embodiments of this application.

Optionally, as shown in FIG. 2 and FIG. 3, the electrode plates of the cells include a first electrode plate 11 and a second electrode plate 12. Separators of the cells include a first separator 21 and a second separator 22. The cells are formed by winding the first separator 21, the first electrode plate 11, the second separator 22, and the second electrode plate together.

Refer to FIG. 2. FIG. 2 is a schematic structural diagram of a winding apparatus 1000 provided in some other embodiments of this application.

As shown in FIG. 2, optionally, the winding apparatus 1000 includes a dancer roll configured to adjust the tension of the electrode plates or separators. Optionally, the dancer roll includes: a first dancer roll 410, configured to adjust the tension of the first separator 21, a second dancer roll 420, configured to adjust the tension of the first electrode plate 11; a third dancer roll 430, configured to adjust the tension of the second separator 22, and a fourth dancer roll 440, configured to adjust the tension of the second electrode plate 12. The first dancer roll 410, the second dancer roll 420, the third dancer roll 430, and the fourth dancer roll 440 may each be provided on in a quantity of one or in plurality. For example, one first dancer roll 410, two or three second dancer rolls 420, one third dancer roll 430, and two or three fourth dancer rolls 440 may be provided.

In a process of using the winding apparatus 1000, the first separator 21 is released from a first separator roll and wound around the winding shaft structure 100 by the first dancer roll 410. The first separator roll is used for feeding of the first separator 21, and the first dancer roll 410 is used for adjusting the tension of the first separator 21. Likewise, the first electrode plate 11 is released from the first electrode plate roll and wound around the winding shaft structure 100 by the second dancer roll 420. The second separator 22 is released from the second separator roll and wound around the winding shaft structure 100 by the third dancer roll 430. The second electrode plate 12 is released from the second electrode plate roll and wound around the winding shaft structure 100 by the fourth dancer roll 440.

There are many ways of providing the detection component 200. As shown in FIG. 2, the detection component 200, for example, includes a first detection part 210, where the first detection part 210 is configured to detect misalignment information of the electrode plates. The first detection part 210 may be provided in a quantity of one, where the one first detection part 210 is configured to obtain misalignment information of the first electrode plate 11 or the second electrode plate 12. The first detection part 210 may alternatively be provided in a quantity of two, where one first detection part 210 is configured to obtain misalignment information of the first electrode plate 11, and the other first detection part 210 is configured to obtain misalignment information of the second electrode plate 12.

This application uses two first detection parts 210 as an example for illustration. When two first detection parts 210 are provided, the first detection parts 210 may be disposed at different positions. Optionally, the first detection parts 210 may be disposed near the second dancer roll 420 or the fourth dancer roll 440. For example, when three second dancer rolls 420 are provided, the first detection parts 210 may be disposed between two adjacent second dancer rolls 420. The position of the first electrode plate 11 between two second dancer rolls 420 is more stable, helpful for the first detection parts 210 to obtain correct misalignment information of the first electrode plate 11. When three third dancer rolls 430 are provided, the first detection parts 210 may be disposed between two adjacent third dancer rolls 430. The position of the second electrode plate 12 between two third dancer rolls 430 is more stable, helpful for the first detection parts 210 to obtain correct misalignment information of the second electrode plate 12. In addition, the first detection parts 210 may be close to the first electrode plate roll and the second electrode plate roll, so as to quickly obtain misalignment information, which is helpful for the processing component 300 to control the radial length of the winding shaft structure 100 based on the misalignment information.

The first detection part 210 may be, for example, a photoelectric sensor. For example, the photoelectric sensor obtains misalignment information of the first electrode plate 11 and/or the second electrode plate 12.

Refer to FIG. 3. FIG. 3 is a schematic structural diagram of a winding apparatus 1000 provided in still some other embodiments of this application.

As shown in FIG. 3, in still some other embodiments, the detection component 200 includes: a second detection part 220, configured to detect thickness information of the electrode plates and/or separators and to verify misalignment information based on the thickness information. The second detection part 220 may be provided in a quantity of one or in plurality. For example, four second detection parts 220 are provided, and the second detection parts 220 are configured to detect thickness information of the first separator 21, the first electrode plate 11, the second separator 22, and the second electrode plate 12, respectively. For example, as is obtained by the second detection part 220, a thickness change of the first separator 21 is $\Delta d1$, a thickness change of the first electrode plate 11 is $\Delta d2$, a thickness change of the second separator 22 is $\Delta d3$, and a thickness change of the second electrode plate 12 is $\Delta d4$. Then, a thickness change around the winding shaft structure 100 is $\Delta d=\Delta d1+\Delta d2+\Delta d3+\Delta d4$, and a circumference adjustment is $\Delta C=N^*(\Delta d1+\Delta d2+\Delta d3+\Delta d4)$, where N is the number of layers of membranes wound around the winding shaft structure 100. Because the first separator 21, the first electrode plate 11, the second separator 22, and the second electrode plate 12 are synchronously wound around the winding shaft structure 100, N may be the number of layers of any one of the first separator 21, the first electrode plate 11, the second separator 22, and the second electrode plate 12 wound around the winding shaft structure 100. Therefore, misalignment information can be determined based on the thickness information.

In some other optional embodiments, the second detection part 220 may further obtain thickness information of at least one of the first separator 21, the first electrode plate 11, the second separator 22, or the second electrode plate 12 and determine misalignment information based on the thickness information.

Figure 4:
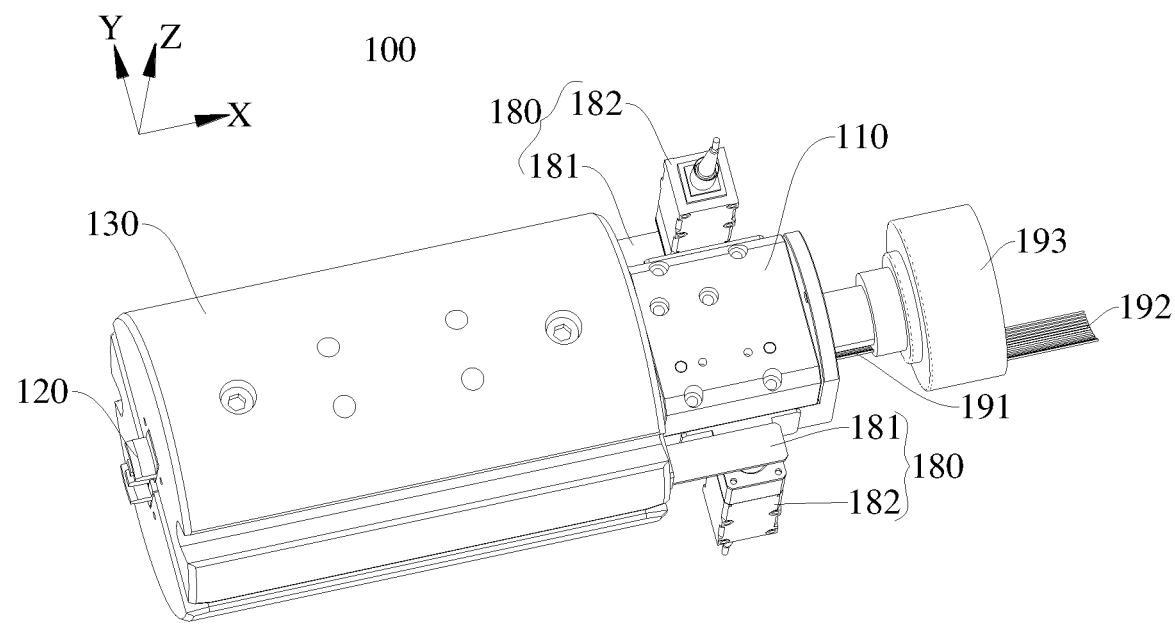
FIG. 4 is a three-dimensional schematic structural diagram of a winding shaft structure according to some embodiments of this application.
Figure 5:
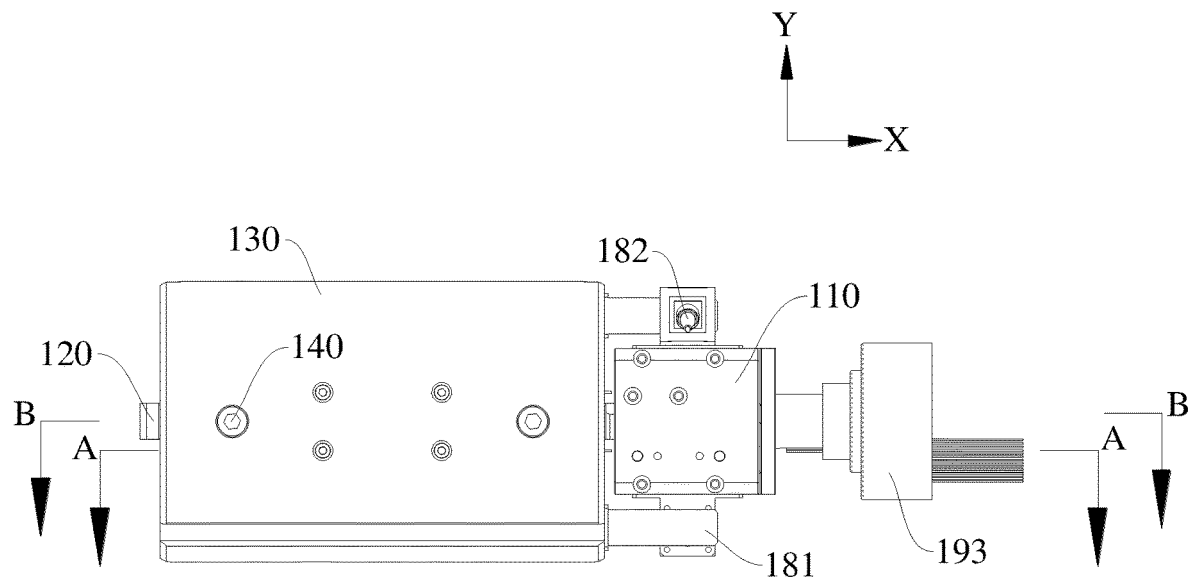
FIG. 5 is a top view of a winding shaft structure according to some embodiments of this application.
Figure 6:
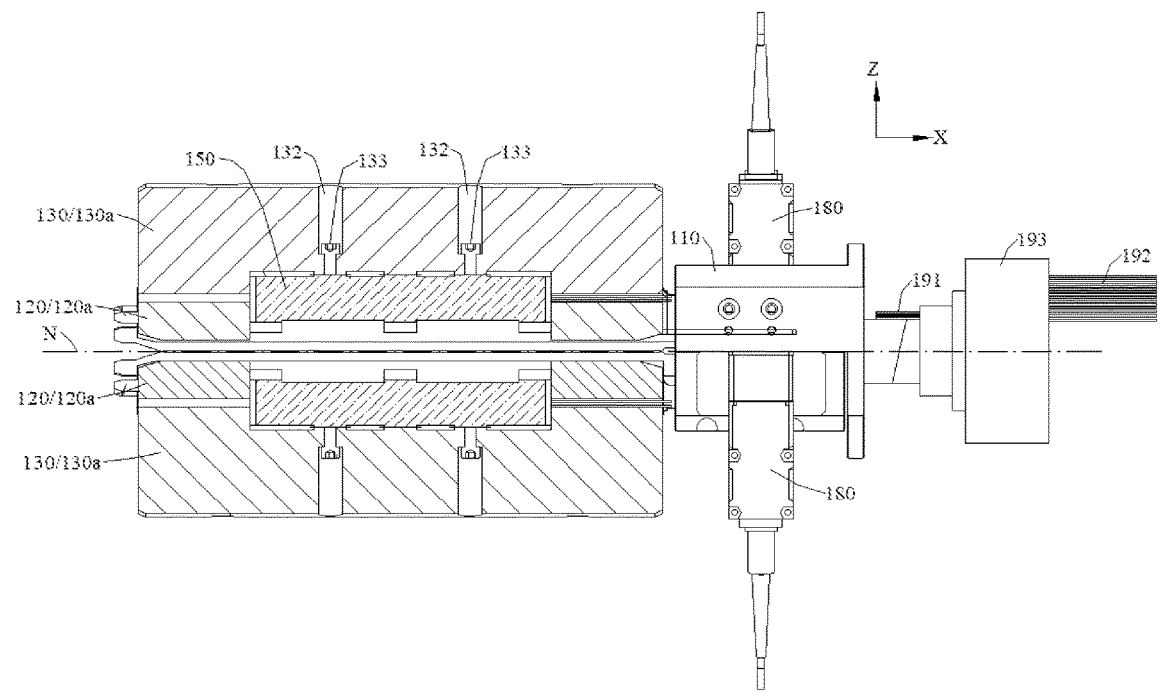
FIG. 6 is a sectional view of location A-A in FIG. 5.

Refer to FIG. 4 to FIG. 6. FIG. 4 is a three-dimensional schematic diagram of a winding shaft structure 100 provided in some embodiments of this application; FIG. 5 is a top view of a winding shaft structure 100 provided in some embodiments of this application; and FIG. 6 is a sectional view of location A-A in FIG. 5.

As shown in FIG. 4 to FIG. 6, the winding shaft structure 100 includes: a winding shaft holder 110, rotatable around an axial direction of the winding shaft structure 100; a first shaft group 120, connected to a side of the winding shaft holder 110 in the axial direction and able to rotate as the winding shaft holder 110 rotates; a second shaft group 130, disposed on a side of the first shaft group 120 in a radial direction of the winding shaft structure 100; a connecting member 140, connected between the first shaft group 120 and the second shaft group 130, and the second shaft group 130 is movable in the radial direction with respect to the first shaft group 120 via the connecting member 140; a piezoelectric adjustment member 150, disposed between the first shaft group 120 and the second shaft group 130, where the piezoelectric adjustment member 150 is deformable in the radial direction, so as to adjust distance between the first shaft group 120 and the second shaft group 130 adjusted via deformation of the piezoelectric adjustment member 150.

The axial direction is direction X in FIG. 4, and the radial direction is on a plane perpendicular to direction X. The radial direction may be direction Z or direction Y in FIG. 1.

The winding shaft holder 110 may drive, in many ways, the first shaft group 120 to rotate. Optionally, at least part of the first shaft group 120 is inserted in the winding shaft holder 110. When the winding shaft holder 110 rotates, the first shaft group 120 rotates following the winding shaft holder 110.

The winding shaft holder 110 is configured to drive the first shaft group 120 to rotate. The winding shaft holder 110, for example, may be connected to a motor. The motor drives the winding shaft holder 110 to rotate, so that the winding shaft holder 110 is able to drive the first shaft group 120 and in turn drive the second shaft group 130 connected via the connecting member 140 to the first shaft group 120 to rotate. The winding shaft holder 110 is rotatable around its own axis N.

The second shaft group 130 is on a side of the first shaft group 120 away from the axis N. Electrode plates and separators may be wound on an outer surface of the second shaft group 130 away from the first shaft group 120. Therefore, the size of an outer contour of the second shaft group 130 determines the winding size of the electrode plates and separators, and it can be deemed that the size of the outer contour of the second shaft group 130 determines the radial length of the winding shafts mentioned above. The first shaft group 120 and the second shaft group 130 together constitute the winding shafts for winding the electrode plates and separators, and the size of the outer contour of the second shaft group 130 determines the radial length of the winding shafts. The second shaft group 130 is connected via the connecting member 140 to the first shaft group 120 and is movable in the radial direction with respect to the first shaft group 120. Optionally, the second shaft group 130 is fixed in the axial direction with respect to the first shaft group 120 via the connecting member 140, so as to reduce friction between the first shaft group 120 and the second shaft group 130.

The piezoelectric adjustment member 150 includes, for example, a piezoelectric crystal. Changing intensity of an electric field in which the piezoelectric crystal is in can change the deformation amount of the piezoelectric crystal, thereby changing the moving distance of the second shaft group 130 in the radial direction and changing the radial length of the winding shafts. The piezoelectric adjustment member 150 may be a finished product as in a related technology and disposed between the first shaft group 120 and the second shaft group 130.

In the technical solution of embodiments of this application, the winding shaft structure 100 includes the winding shaft holder 110, the first shaft group 120, the second shaft group 130, the connecting member 140, and the piezoelectric adjustment member 150. The winding shaft holder 110 is rotatable, so that the winding shaft holder 110 is able to drive the first shaft group 120 and the second shaft group 130 to rotate, thereby winding electrode plates wound around the second shaft group 130 to form cells. The first shaft group 120 and the second shaft group 130 are connected via the connecting member 140, and the second shaft group 130 is movable with respect to the first shaft group 120 in the radial direction via the connecting member 140. The second shaft group 130 moving with respect to the first shaft group 120 in the radial direction can change the radial length of the outer contour of the second shaft group 130, thereby changing the radial length of the winding shafts and the radial length of cells wound around the winding shaft structure 100. The piezoelectric adjustment member 150 is configured to adjust distance between the first shaft group 120 and the second shaft group 130 by deformation. For one, the adjustment by the deformation of the piezoelectric adjustment member 150 facilitates a simple structure and ease of use; for another, such adjustment can reduce friction between the first shaft group 120 and the piezoelectric adjustment member 150 and between the second shaft group 130 and the piezoelectric adjustment member 150, thereby reducing metal fragments produced by the friction which fall to the electrode plates to affect the performance of cells. Therefore, the winding shaft structure 100 provided in embodiments of this application is not only able to adjust its radial length but also simple in structure, easy to use, and not prone to produce metal fragments.

Continue to refer to FIG. 6. In some embodiments of this application, optionally, the first shaft group 120 includes at least two inner shafts 120*a*, where the at least two inner shafts 120*a* are distributed around the axis N extending in the axial direction and the winding shaft holder 110 is rotatable around the axis N; and the second shaft group 130 includes at least two outer shafts 130*a*, where the outer shafts 130*a* each are disposed on a side of the respective inner shaft 120*a* away from the axis N, each of the outer shafts 130*a* is connected to the respective inner shaft 120*a* via the respective connecting member 140, and the piezoelectric adjustment member 150 is disposed between each of the outer shafts 130*a* and the respective inner shaft 120*a*.

In FIG. 6, the axis N of the winding shaft structure 100 is represented by a dotted line, and the axis N imposes no structural limitation on the winding shaft structure 100. The inner shafts 120*a* and the outer shafts 130*a* may be provided a one-to-one mapping, and the inner shaft 120*a* and outer shaft 130*a* of each pair are connected by the connecting member 140. The piezoelectric adjustment member 150 is disposed between each pair of inner shaft 120*a* and outer shaft 130*a*.

Providing the plurality of inner shafts 120*a* and the outer shafts 130*a* corresponding to the inner shafts 120*a* respectively allows increasing the size of radial adjustment, adjusting radial lengths of the winding shaft structure 100 at different locations, and adjusting the shape of the winding shaft structure 100.

The inner shafts 120*a* and the outer shafts 130*a* may be provided in different quantities. The number of inner shafts 120*a* and the number of outer shafts 130*a* are both two for illustrative purposes in this disclosure. The two inner shafts 120*a* are symmetrically disposed on two sides of the axis N, and the two outer shafts 130*a* are also symmetrically disposed on a side of the two inner shafts 120*a* away from the axis N. The two outer shafts 130*a* moving in the radial direction with respect to the respective inner shafts 120*a* can change the size of the outer contour of the second shaft group 130.

Figure 7:
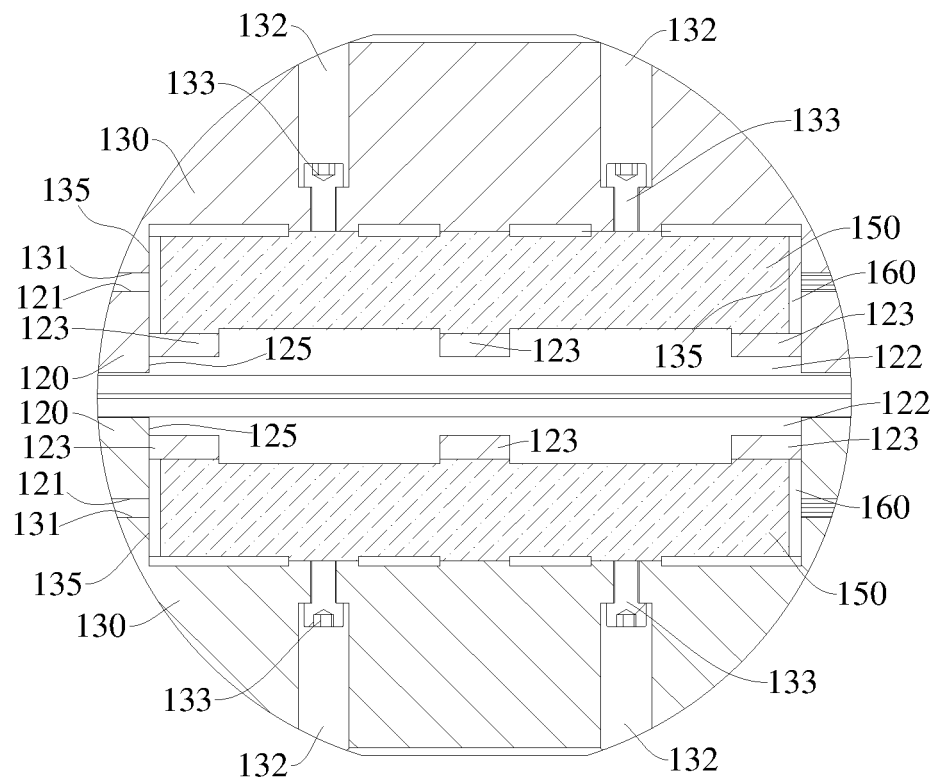
FIG. 7 is a locally enlarged view of location I in FIG. 6.

Refer to FIG. 6 and FIG. 7. According to some embodiments of this application, FIG. 7 is a locally enlarged view of location I in FIG. 6. Optionally, the first shaft group 120 has a first surface 121 on a side facing towards the second shaft group 130; the second shaft group 130 has a second surface 131 on a side facing towards the first shaft group 120; and at least one of the first surface 121 or the second surface 131 recesses to form an accommodating chamber 160 and at least some of the piezoelectric adjustment members 150 are disposed in the accommodating chamber 160.

When the first shaft group 120 contains at least two inner shafts 120*a* and the second shaft group 130 contains at least two outer shafts 130*a*, the first surface 121 is a surface on the inner shafts 120*a* facing towards the outer shafts 130*a*, and the second surface 131 is a surface on the outer shafts 130*a* facing towards the inner shafts 120*a*.

The provision of the accommodating chamber 160 limits the position of the piezoelectric adjustment member 150, reducing sway of the piezoelectric adjustment member 150 between the first shaft group 120 and the second shaft group 130, thus reducing friction between the first shaft group 120 and the piezoelectric adjustment member 150 and between the second shaft group 130 and the piezoelectric adjustment member 150, making it less prone to produce metal fragments.

According to some embodiments of this application, as shown in FIG. 6 and FIG. 7, optionally, the second surface 131 recesses to form the accommodating chamber 160; and the first shaft group 120 includes a mounting hole 122 running through in the radial direction and a mounting boss 123 disposed in the mounting hole 122, where the mounting hole 122 communicates with the accommodating chamber 160, the mounting boss 123 is formed by the first shaft group 120 protruding towards an inner surface 125 of the mounting hole 122, and the piezoelectric adjustment member 150 is disposed on the mounting boss 123.

The accommodating chamber 160 is formed by the second surface 131 recessing in a direction leaving the first shaft group 120. The accommodating chamber 160 communicates with the mounting hole 122. The accommodating chamber 160 and the mounting hole 122 together form a space for accommodating the piezoelectric adjustment member 150.

The mounting boss 123 may be provided in different quantities. For example, one mounting boss 123 is provided and the size of the mounting boss 123 is relatively large, so that the piezoelectric adjustment member 150 can be disposed stably between the mounting boss 123 and the second shaft group 130. Alternatively, a plurality of mounting bosses 123 are provided and the plurality of mounting bosses 123 are spaced to jointly support the piezoelectric adjustment member 150. Optionally, the mounting hole 122 is a rectangular hole. The first shaft group 120 has four inner surfaces 125 facing towards the mounting hole 122. Each of the inner surfaces 125 is provided with a mounting boss 123.

Provided on the first shaft group 120, the mounting bosses 123 can be used to make the first shaft group 120 and the piezoelectric adjustment member 150 press against each other, reducing a fit area between the first shaft group 120 and the piezoelectric adjustment member 150. For one, this can make the preparation of the first shaft group 120 and the piezoelectric adjustment member 150 less difficult; for another, it can further reduce friction between the first shaft group 120 and the piezoelectric adjustment member 150, making it less prone to produce metal fragments.

Optionally, the accommodating chamber 160 has an opening facing towards the first shaft group 120. The mounting hole 122 and the accommodating chamber 160 fit each other in size, so that the inner surface 125 of the first shaft group 120 facing towards the mounting hole 122 is in parallel to the inner surface 135 of the second shaft group 130 facing towards the accommodating chamber 160. This can expand the size of the space accommodating the piezoelectric adjustment member 150, so that the piezoelectric adjustment member 150 can press against both the inner surface 125 of the first shaft group 120 facing towards the mounting hole 122 and the inner surface 135 of the second shaft group 130 facing towards the accommodating chamber 160.

According to some embodiments of this application, as shown in FIG. 7, optionally, the second shaft group 130 has a locking hole 132 communicating with the accommodating chamber 160, and the piezoelectric adjustment member 150 is connected to the second shaft group 130 via the locking hole 132.

The second shaft group 130 and the piezoelectric adjustment member 150 can be mutually locked via the locking hole 132, which enhances the relative position stability of the second shaft group 130 and the piezoelectric adjustment member 150, reducing relative sway of the second shaft group 130 and the piezoelectric adjustment member 150, thus reducing friction between the second shaft group 130 and the piezoelectric adjustment member 150, making it less prone to produce metal fragments.

Optionally, the locking hole 132 may be a threaded hole, and a screw 133 is driven into the locking hole 132 to make the piezoelectric adjustment member 150 firm. The locking hole 132 is provided, for example, on a side of the accommodating chamber 160 away from the first shaft group 120. The locking hole 132 extends from the outer surface of the second shaft group 130 to the second accommodating chamber 160 so as to run through the second shaft group 130, making it convenient to lock the piezoelectric adjustment member 150 on the outer surface of the second shaft group 130.

The locking hole 132 is, for example, a step-like hole. When driven into the locking hole 132, the screw 133 can be buried in the locking hole 132, so that the screw 133 does not protrude from the outer surface of the second shaft group 130, thereby preventing the screw 133 from rubbing against electrode plates or membranes wound around the winding shaft structure 100.

The locking hole 132 may be provided in different quantities. The piezoelectric adjustment members 150 may be provided with one or more corresponding locking holes 132. In some optional embodiments, the piezoelectric adjustment members 150 are provided with four locking holes 132. The four locking holes 132 are distributed in two rows and two columns. The four locking holes 132 distributed in two rows and two columns being used to fix the piezoelectric adjustment members 150, not only improves the relative position stability of the piezoelectric adjustment members 150 and the second shaft group 130 but also make the piezoelectric adjustment members 150 experience more even stress.

Figure 8:
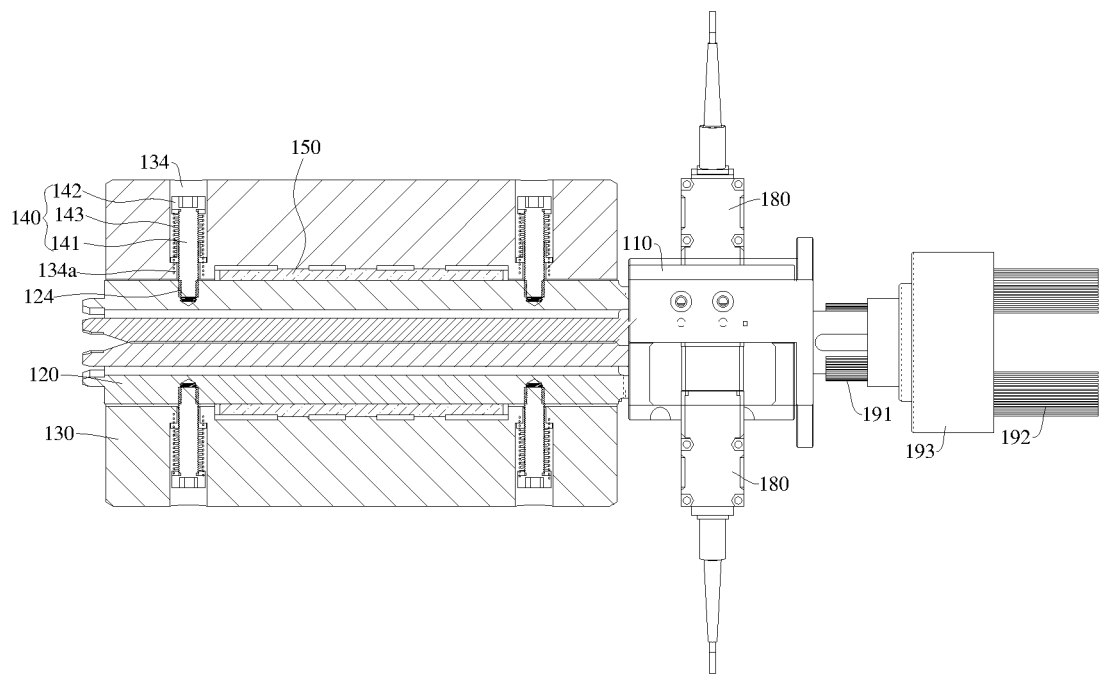
FIG. 8 is a local sectional view of location B-B in FIG. 5.

Refer to FIG. 8. FIG. 8 is a local sectional view of location B-B in FIG. 5.

According to some embodiments of this application, as shown in FIG. 8, optionally the first surface 121 recesses to form a first connecting hole 124; the second shaft group 130 has a second connecting hole 134 running through in the radial direction and communicating with the first connecting hole 124; and the connecting member 140 is disposed in the first connecting hole 124 and the second connecting hole 134 to connect the first shaft group 120 and the second shaft group 130.

The first connecting hole 124 is formed by the first surface 121 recessing in the radial direction away from the second shaft group 130. For example, when the second shaft group 130 includes the outer shaft 130a, and the first shaft group 120 includes the inner shaft 120a, the first connecting hole 124 is formed by the first surface 121 of the inner shaft 120a recessing in the radial direction away from the outer shaft 130a.

The connecting member 140 disposed in the first connecting hole 124 and the second connecting hole 134 not only connects the first shaft group 120 and the second shaft group 130 but also clamps the piezoelectric adjustment member 150 between the first shaft group 120 and the second shaft group 130. In addition, disposing the connecting member 140 in the second connecting hole 134 extending in the radial direction can limit the position of the second shaft group 130 in the axial direction, improving the movement of the second shaft group 130 in the axial direction with respect to the first shaft group 120.

The first connecting hole 124 and the second connecting hole 134 may be provided in different quantities. For example, two first connecting holes 124 and two second connecting holes 134 are provided, the first connecting holes 124 and the second connecting holes 134 are disposed in one-to-one mapping, and the two pairs of first connecting holes 124 and second connecting holes 134 are disposed on two sides of the locking holes 132 respectively. This can improve the relative position stability of the first shaft group 120 and the second shaft group 130.

According to some embodiments of this application, as shown in FIG. 8, optionally the connecting member 140 includes: a connecting rod 141, configured to run through the first connecting hole 124 and the second connecting hole 134; a stopping part 142, disposed on a side of the connecting rod 141 away from the first shaft group 120; and a resetting member 143, where the first connecting hole 124 is a step-like hole and includes a recess 134a, the recess 134a is on a side of the stopping part 142 facing towards the first surface 121, the resetting member 143 is stopped between the stopping part 142 and the recess 134a, and the resetting member 143 provides a reset force in the radial direction.

The connecting rod 141 may be, for example, a threaded rod. The first connecting hole 124 and the second connecting hole 134 are internal threaded holes. The connecting rod 141 is connected threadedly to inside the first connecting hole 124 and the second connecting hole 134.

The stopping part 142 may be, for example, a nut of the connecting rod 141.

The resetting member 143 may be provided in many ways. For example, the resetting member 143 is a spring nested to the connecting rod 141 and stopped between the stopping part 142 and the recess 134a. The reset force is the elastic force of the spring.

Via the reset force, the first shaft group 120 and the second shaft group 130 are provided with a reset force. Therefore, the relative position stability of the first shaft group 120 and the second shaft group 130 can be ensured both before and after the second shaft group 130 moves in the radial direction with respect to the first shaft group 120 via the piezoelectric adjustment member 150, thus reducing friction between the first shaft group 120 and the piezoelectric adjustment member 150 and between the second shaft group 130 and the piezoelectric adjustment member 150, making it less prone to produce metal fragments.

Figure 9:
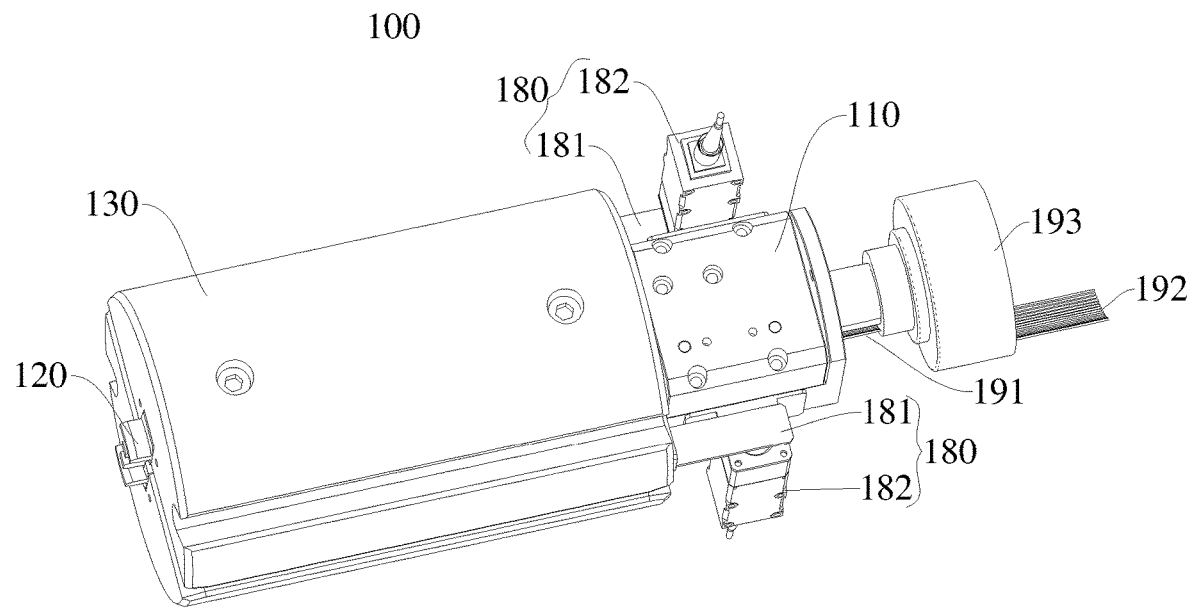
FIG. 9 is a schematic structural view of a winding shaft structure according to some other embodiments of this application.
Figure 10:
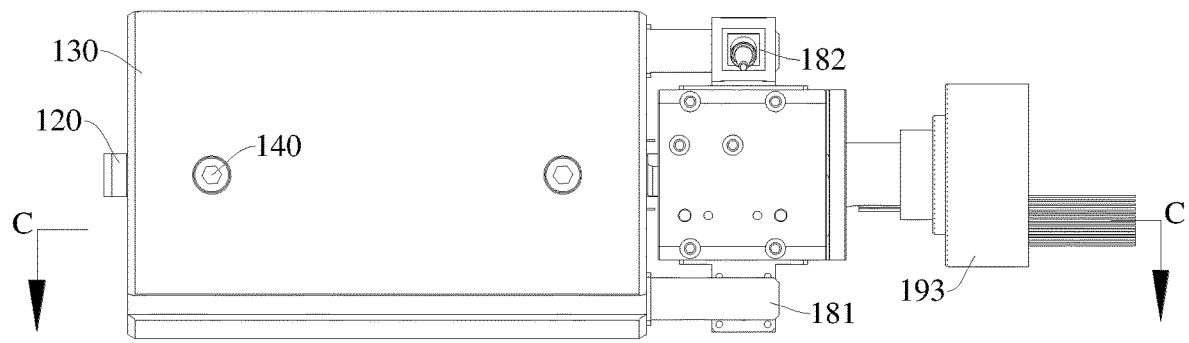
FIG. 10 is a top view of a winding shaft structure according to still some other embodiments of this application.
Figure 11:
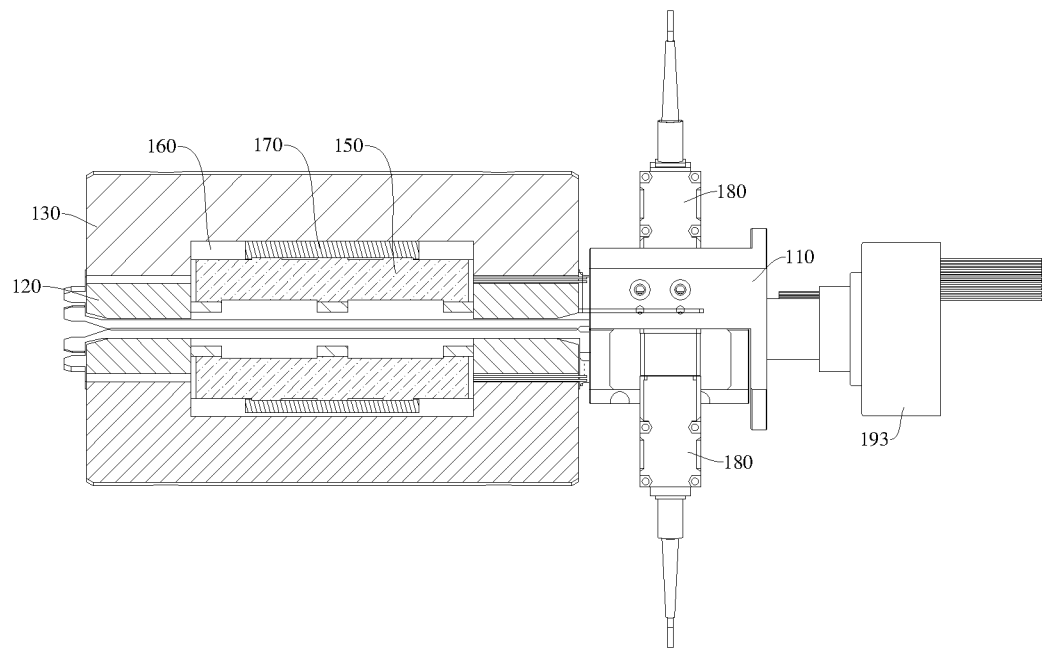
FIG. 11 is a sectional view of location C-C in FIG. 10.
Figure 12:
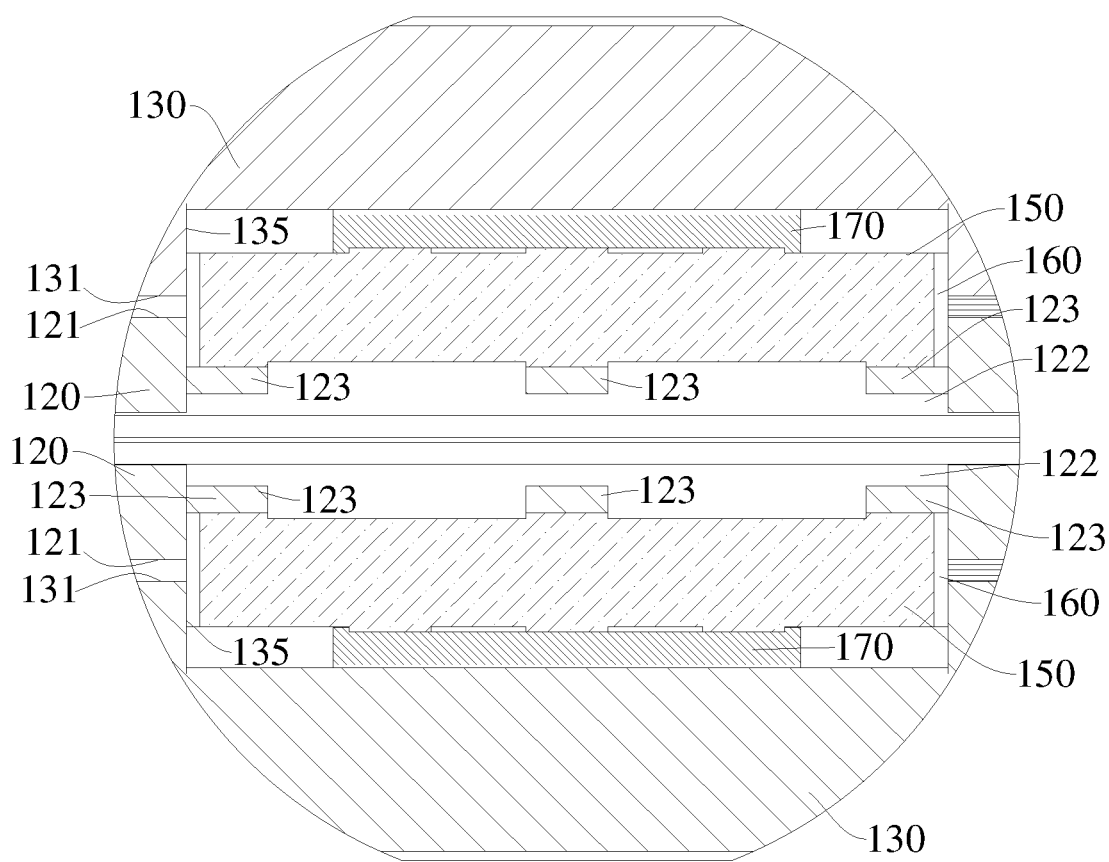
FIG. 12 is a locally enlarged view of location II in FIG. 11.

Refer to FIG. 9 to FIG. 12. FIG. 9 is a three-dimensional schematic diagram of a winding shaft structure 100 provided in some other embodiments of this application. FIG. 10 is a top view of a winding shaft structure 100 provided in some other embodiments of this application. FIG. 11 is a sectional view of location C-C in FIG. 10. FIG. 12 is a locally enlarged view of location II in FIG. 11.

According to some embodiments of this application, as shown in FIG. 9 to FIG. 12, optionally the winding shaft structure 100 further includes a spacer 170 disposed between the piezoelectric adjustment member 150 and the second shaft group 130. The piezoelectric adjustment member 150 drives, via the spacer 170, the second shaft group 130 to move in the radial direction.

The spacer 170 is, for example, plate-shaped and presses against the piezoelectric adjustment member 150 and the second shaft group 130 in between. Properly setting the size of the spacer 170 can adjust a contact area between the spacer 170 and the piezoelectric adjustment member 150 and a contact area between the spacer 170 and the second shaft group 130. The spacer 170 may be made of, for example, rubber or metal.

The contact area between the spacer 170 and the piezoelectric adjustment member 150 and the contact area between the spacer 170 and the second shaft group 130 are both smaller than a contact area between the second shaft group 130 and the piezoelectric adjustment member 150, which not only makes preparation of the second shaft group 130 and the outer surface of the piezoelectric adjustment member 150 less difficult but also reduces friction between the second shaft group 130 and the piezoelectric adjustment member 150, making it less prone to produce metal fragments.

According to some embodiments of this application, the winding shaft structure 100 further includes a distance sensor 180 configured to obtain distance between the first shaft group 120 and the second shaft group 130 in the radial direction.

The distance between the first shaft group 120 and the second shaft group 130 in the radial direction can be obtained via the distance sensor 180, making it possible to determine the size of the outer contour of the second shaft group 130 and the winding size of electrode plates wound around the second shaft group 130.

According to some embodiments of this application, optionally, the distance sensor 180 includes a sensing piece 181 and a receiver 182, and of the sensing piece 181 and the receiver 182, one is disposed in the second shaft group 130 and the other one is disposed in the winding shaft holder 110.

The receiver 182 can sense the location of the sensing piece 181 and then determine distance between itself and the sensing piece 181. Then, based on this distance, distance between the first shaft group 120 and the second shaft group 130 in the radial direction can be determined. The receiver 182 may be disposed in the first shaft group 120, and the sensing piece 181 may be disposed in the second shaft group 130.

Optionally, because the first shaft group 120 is disposed in the winding shaft holder 110, the position of the first shaft group 120 relative to the winding shaft holder 110 is stable, and therefore one of the receiver 182 and the sensing piece 181 may be disposed in the winding shaft holder 110, so that the receiver 182 or the sensing piece 181 can be disposed in the first shaft group 120 via the winding shaft holder 110.

Figure 13:
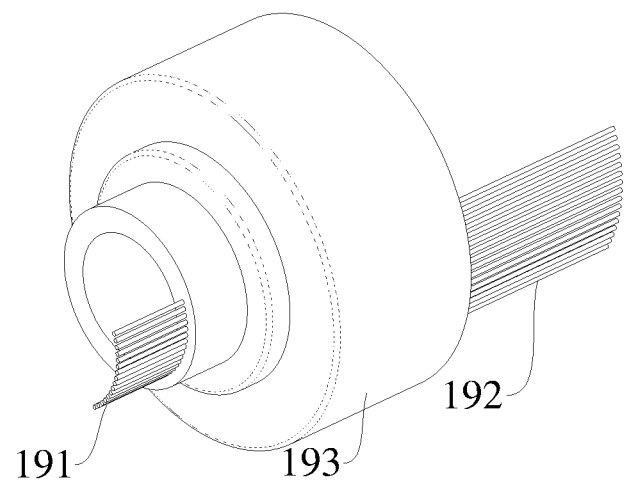
FIG. 13 is a schematic structural diagram of an electric slip ring of a winding shaft structure according to some embodiments of this application.

Refer to FIG. 13. FIG. 13 is a schematic structural diagram of an electric slip ring 193 of a winding shaft structure 100 provided in some embodiments of this application.

According to some embodiments of this application, optionally, as shown in FIG. 13, the winding shaft structure 100 further includes: a first connecting lead 191, connected to the piezoelectric adjustment member 150; a second connecting lead 192, configured to connect an external electric device; and an electric slip ring 193, connecting the first connecting lead 191 and the second connecting lead 192 so that the first connecting lead 191 is movable around the axis N with respect to the second connecting lead 192 via the slip ring structure.

The piezoelectric adjustment member 150 needs to generate an electric field. Therefore, the piezoelectric adjustment member 150 needs to be connected to an external power source. The piezoelectric adjustment member 150 is connected to an external power supply device via the first connecting lead 191, the electric slip ring 193, and the second connecting lead 192. The electric slip ring 193 may be a finished product as in a related technology.

The winding shaft holder 110 rotates when winding electrode plates, and the first shaft group 120 and the second shaft group 130 disposed in the winding shaft holder as well as the piezoelectric adjustment member 150 between the first shaft group 120 and the second shaft group 130 will rotate, resulting in rotation of the first connecting lead 191. Providing the electric slip ring 193 makes the first connecting lead 191 rotatable with respect to the second connecting lead 192, thereby alleviating the inconvenience of use caused by twisting of the second connecting lead 192 and prolonging service life of the first connecting lead 191 and the second connecting lead 192.

Figure 14:
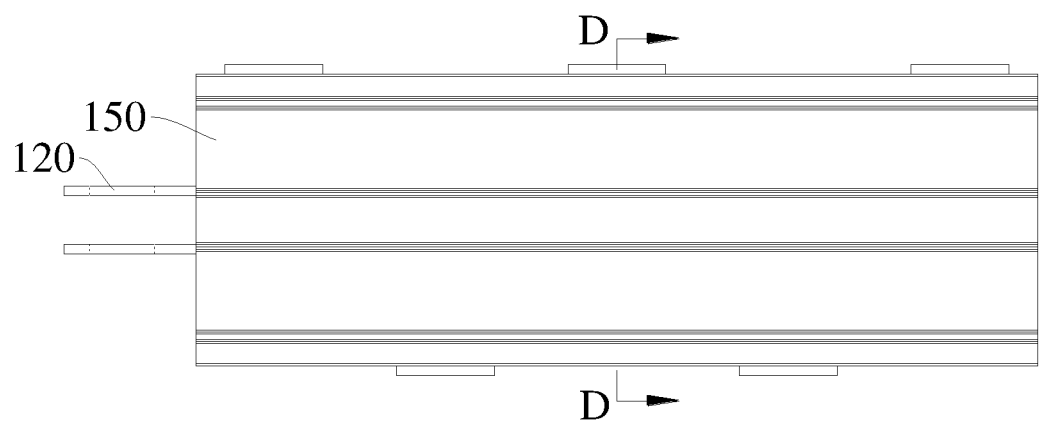
FIG. 14 is a side view of a winding shaft structure according to some embodiments of this application.
Figure 15:
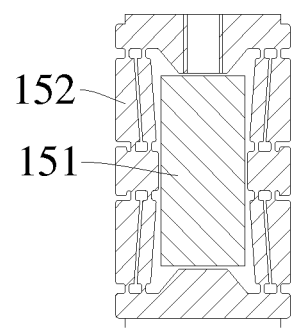
FIG. 15 is a sectional view of location D-D in FIG. 14.

Refer to FIG. 14 and FIG. 15 together. FIG. 14 is a side view of a winding shaft structure 100 provided by some embodiments of this application. FIG. 15 is a sectional view of location D-D in FIG. 14.

According to some embodiments of this application, as shown in FIG. 14 and FIG. 15, optionally the piezoelectric adjustment member 150 further includes a piezoelectric crystal 151 and a mechanical amplification structure 152, where the mechanical amplification structure 152 is disposed outside the piezoelectric crystal 151. The mechanical amplification structure 152 is configured to amplify deformation of the piezoelectric crystal 151 thus to increase deformation of the piezoelectric adjustment member 150, increasing a moving distance of the second shaft group 130 in the radial direction with respect to the first shaft group 120.

According to some embodiments of this application, this application further provides a winding apparatus configured to wind electrode plates and separators to form cells. The winding apparatus includes: a detection component, configured to detect misalignment information of the electrode plates; the winding shaft structure 100 according to any one of the foregoing options; and a processing component, communicatively connected to the detection component and the piezoelectric adjustment member and configured to control deformation of the piezoelectric adjustment member based on the misalignment information.

According to some embodiments of this application, optionally, the detection component includes: a first detection part 210, configured to detect the misalignment information of the electrode plates; and/or a second detection part, configured to detect thickness information of the electrode plates and/or the separators and verify the misalignment information based on the thickness information.

Refer to FIG. 4 to FIG. 8. According to some embodiments of this application, this application provides a winding shaft structure 100. The winding shaft structure 100 includes a winding shaft holder 110, inner shafts 120a, outer shafts 130a, connecting members 140, and piezoelectric adjustment members 150. The winding shaft holder 110 is rotatable around its axis N. Two inner shafts 120a are distributed on two sides of the axis N of the winding shaft holder 110 respectively and able to rotate as the winding shaft holder 110 rotates. The outer shafts 130a are disposed on the outer side of the inner shafts 120a away from the axis N. The connecting member 140 extends in a radial direction and connects the inner shaft 120a and the outer shafts 130a. A resetting member 143 is provided on the connecting member 140. The outer shaft 130a recesses towards a second surface 131 of the inner shaft 120a to form an accommodating chamber 160. Inside a mounting hole 122 of the inner shaft 120a, a mounting boss 123 is provided. The piezoelectric adjustment member 150 presses against the mounting boss 123 and the inside of the accommodating chamber 160. In addition, the piezoelectric adjustment member 150 is connected to the outer shaft 130a via a locking hole 132.

When the piezoelectric adjustment member 150 swells so as to deform and the piezoelectric adjustment member 150 increases in size in the radial direction, the resetting member 143 is contracted, and the outer shaft 130a moves in a direction leaving the axis N with respect to the first shaft group 120. As a result, distance between the two outer shafts 130a increases, sizes of outer contours of the two outer shafts 130a increase, and radial length of the winding shaft structure 100 increases.

Refer to FIG. 9 to FIG. 12. According to some embodiments of this application, this application provides a winding shaft structure 100. The winding shaft structure 100 includes a winding shaft holder 110, inner shafts 120a, outer shafts 130a, connecting members 140, and piezoelectric adjustment members 150. The winding shaft holder 110 is rotatable around its axis N. Two inner shafts 120a are distributed on two sides of the axis N of the winding shaft holder 110 respectively and able to rotate as the winding shaft holder 110 rotates. The outer shafts 130a are disposed on the outer side of the inner shafts 120a away from the axis N. The connecting member 140 extends in a radial direction and connects the inner shaft 120a and the outer shaft 130a. A resetting member 143 is provided on the connecting member 140. The outer shaft 130a recesses towards a second surface 131 of the inner shaft 120a to form an accommodating chamber 160. Inside a mounting hole 122 of the inner shaft 120a, a mounting boss 123 is provided. A spacer 170 is provided inside the accommodating chamber 160. The piezoelectric adjustment member 150 presses against the mounting boss 123 and the spacer 170. In addition, the piezoelectric adjustment member 150 is connected to the outer shaft 130a via a locking hole 132.

When the piezoelectric adjustment member 150 swells so as deform and the piezoelectric adjustment member 150 increases in size in the radial direction, the resetting member 143 is contracted, and the piezoelectric adjustment member 150 drives, via the spacer 170, the outer shaft 130a to move with respect to the first shaft group 120 in a direction leaving the axis N. As a result, distance between the two outer shafts 130a increases, sizes of outer contours of the two outer shafts 130a increase, and radial length of the winding shaft structure 100 increases.

In conclusion, it should be noted that the above embodiments are merely intended for describing the technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of this application. Such modifications and replacements shall all be covered in the scope of the claims and summary of this application. In particular, as long as there is no structural conflict, the various technical features mentioned in the embodiments can be combined in any manners. This application is not limited to the specific embodiments disclosed in this specification, but includes all technical solutions falling within the scope of the claims.

What is claimed is:

1. A winding shaft structure, comprising:
a winding shaft holder, rotatable around an axial direction of the winding shaft structure;
a first shaft group, connected to one side of the winding shaft holder in the axial direction and configured to rotate together with the winding shaft holder;
a second shaft group, disposed on one side of the first shaft group in a radial direction of the winding shaft structure;
a connecting member, connected between the first shaft group and the second shaft group, wherein the second shaft group is movable with respect to the first shaft group in the radial direction via the connecting member; and
a piezoelectric adjustment member, disposed between the first shaft group and the second shaft group, wherein the piezoelectric adjustment member is deformable in the radial direction to adjust a distance between the first shaft group and the second shaft group;
wherein:

the first shaft group has a first surface on a side facing towards the second shaft group and recessing to form a first connecting hole, the first connecting hole is a step-like hole and comprises a recess;

the second shaft group has a second surface on a side facing towards the first shaft group and having a second connecting hole running through in the radial direction and communicating with the first connecting hole; and the connecting member comprises:
   a connecting rod, configured to run through the first connecting hole and the second connecting hole;
   a stopping part, disposed on a side of the connecting rod away from the first shaft group, the recess being on a side of the stopping part facing towards the first surface; and
   a resetting member stopped between the stopping part and the recess, the resetting member providing a reset force in the radial direction.

2. The winding shaft structure according to claim 1, wherein:
   the connecting member is one of at least two connecting members;
   the first shaft group comprises at least two inner shafts, wherein the at least two inner shafts are distributed around an axis extending in the axial direction and the winding shaft holder is rotatable around the axis; and
   the second shaft group comprises at least two outer shafts, wherein the outer shafts are each disposed on a side of the respective inner shaft away from the axis, each of the outer shafts is connected to a corresponding one of the at least two inner shafts via a corresponding one of the at least two connecting members, and the piezoelectric adjustment member is disposed between each of the outer shafts and the corresponding inner shaft.

3. The winding shaft structure according to claim 1, wherein:
   at least one of the first surface or the second surface recesses to form an accommodating chamber, and at least part of the piezoelectric adjustment member is disposed in the accommodating chamber.

4. The winding shaft structure according to claim 3, wherein:
   the second surface recesses to form the accommodating chamber; and
   the first shaft group comprises a mounting hole running through in the radial direction and a mounting boss disposed in the mounting hole, wherein the mounting hole communicates with the accommodating chamber, the mounting boss is formed by the first shaft group protruding towards an inner surface of the mounting hole, and the piezoelectric adjustment member is disposed on the mounting boss.

5. The winding shaft structure according to claim 3, wherein the second shaft group has a locking hole in communication with the accommodating chamber and the piezoelectric adjustment member is connected to the second shaft group via the locking hole.

6. The winding shaft structure according to claim 1, further comprising:
   a spacer disposed between the piezoelectric adjustment member and the second shaft group;
   wherein the piezoelectric adjustment member drives, via the spacer, the second shaft group to move in the radial direction.

7. The winding shaft structure according to claim 1, further comprising:

a distance sensor configured to obtain the distance between the first shaft group and the second shaft group in the radial direction.

8. The winding shaft structure according to claim 7, wherein the distance sensor comprises a sensing piece and a receiver, one of the sensing piece and the receiver is disposed at the second shaft group and another one of the sensing piece and the receiver is disposed at the winding shaft holder.

9. The winding shaft structure according to claim 1, further comprising:
   a first connecting lead, connected to the piezoelectric adjustment member;
   a second connecting lead, configured to connect an external electric device; and
   an electric slip ring, connecting the first connecting lead and the second connecting lead so that the first connecting lead is rotatable around the axis with respect to the second connecting lead via the slip ring structure.

10. A winding apparatus, comprising:
   a detection component, configured to detect misalignment information of an electrode plate;
   a winding shaft structure, comprising:
      a winding shaft holder, rotatable around an axial direction of the winding shaft structure;
      a first shaft group, connected to one side of the winding shaft holder in the axial direction and configured to rotate together with the winding shaft holder;
      a second shaft group, disposed on one side of the first shaft group in a radial direction of the winding shaft structure;
      a connecting member, connected between the first shaft group and the second shaft group, wherein the second shaft group is movable with respect to the first shaft group in the radial direction via the connecting member; and
      a piezoelectric adjustment member, disposed between the first shaft group and the second shaft group, wherein the piezoelectric adjustment member is deformable in the radial direction to adjust a distance between the first shaft group and the second shaft group;
   wherein:
      the first shaft group has a first surface on a side facing towards the second shaft group and recessing to form a first connecting hole, the first connecting hole is a step-like hole and comprises a recess;
      the second shaft group has a second surface on a side facing towards the first shaft group and having a second connecting hole running through in the radial direction and communicating with the first connecting hole; and
      the connecting member comprises:
         a connecting rod, configured to run through the first connecting hole and the second connecting hole;
         a stopping part, disposed on a side of the connecting rod away from the first shaft group, the recess being on a side of the stopping part facing towards the first surface; and
         a resetting member stopped between the stopping part and the recess, the resetting member providing a reset force in the radial direction; and
   a processing component, communicatively connected to the detection component and the piezoelectric adjustment member, and configured to control deformation of the piezoelectric adjustment member based on the misalignment information.

11. The winding apparatus according to claim 10, wherein the detection component comprises at least one of:
   a first detection part, configured to detect the misalignment information of the electrode plate; or
   a second detection part, configured to:
      detect thickness information of at least one of the electrode plate or a separator that are being wound by the winding apparatus to form a cell; and
      verify the misalignment information based on the thickness information.

* * * * *